United States Patent [19]

Leach

[11] Patent Number: 4,960,179
[45] Date of Patent: Oct. 2, 1990

[54] POWERED HEAVY-DUTY HAND TRUCK

[76] Inventor: Norman Leach, 2326 N. Eiffel Ct., Decatur, Ga. 30032

[21] Appl. No.: 354,899

[22] Filed: May 19, 1989

[51] Int. Cl.$^5$ ............................................. B62B 5/02
[52] U.S. Cl. .................................... 180/8.2; 280/5.28; 280/5.3; 280/47.27
[58] Field of Search .................... 180/8.2; 280/5.2, 5.3, 280/5.22, 5.24, 5.26, 5.28, .32, 47.27, 47.28; 414/448, 490

[56] References Cited

U.S. PATENT DOCUMENTS

| | | | |
|---|---|---|---|
| 2,680,026 | 6/1954 | Cushman | 280/5.2 |
| 2,740,484 | 4/1956 | Montana | 280/5.22 |
| 3,788,413 | 1/1974 | Miller | 180/8.2 |
| 3,850,441 | 11/1974 | Peters et al. | 280/47.2 |
| 4,674,757 | 6/1987 | Martin | 280/5.26 |
| 4,728,245 | 3/1988 | Shelton | 280/47.2 |
| 4,865,339 | 9/1989 | Rundborg et al. | 280/47.27 |

FOREIGN PATENT DOCUMENTS 2434070  4/1980  France ................................ 280/47.2

Primary Examiner—Charles A. Marmor
Assistant Examiner—Anne Marie Boehler
Attorney, Agent, or Firm—Richard L. Miller

[57] ABSTRACT

This hand truck is designed to enable heavy cargo to be easily transported up or down stairs. The truck utilizes a pair of rotatable large wheels with radially and equally spaced apart lobes or projections to engage with steps, so as to prevent an operator from struggling when ascending or descending the steps with the cargo. These large wheels are electric motor driven and fixed in position on the frame of the hand truck, and a pair of small wheels are provided for flat surface travel on a flat surface by a hand crank mechanism attached to the frame of the truck. In one embodiment a crank mechanism is provided with a pair of worm shafts, guide rails, bevel gears, and other components, for lowering and elevating the small wheels.

5 Claims, 2 Drawing Sheets

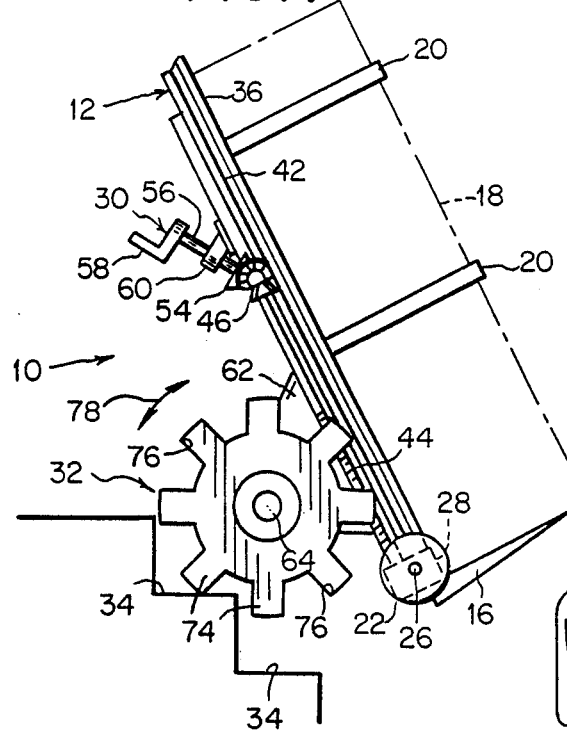
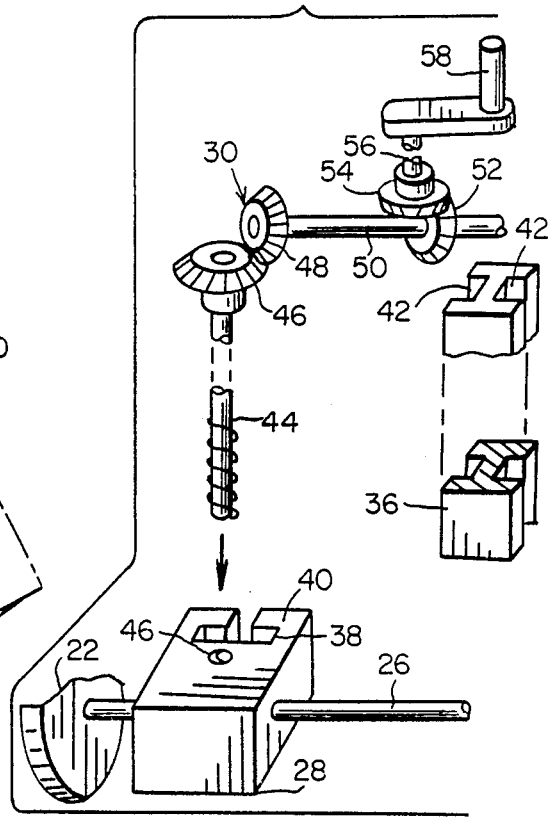
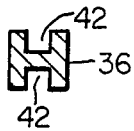
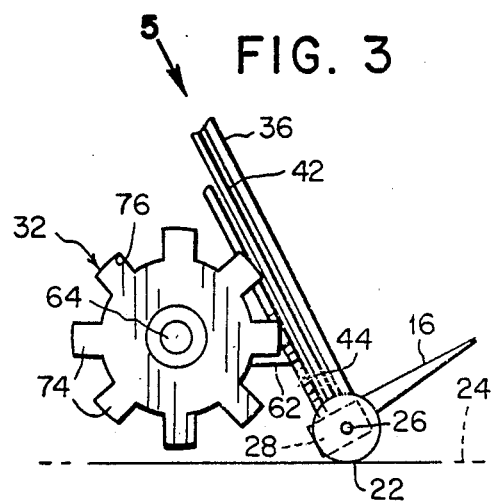
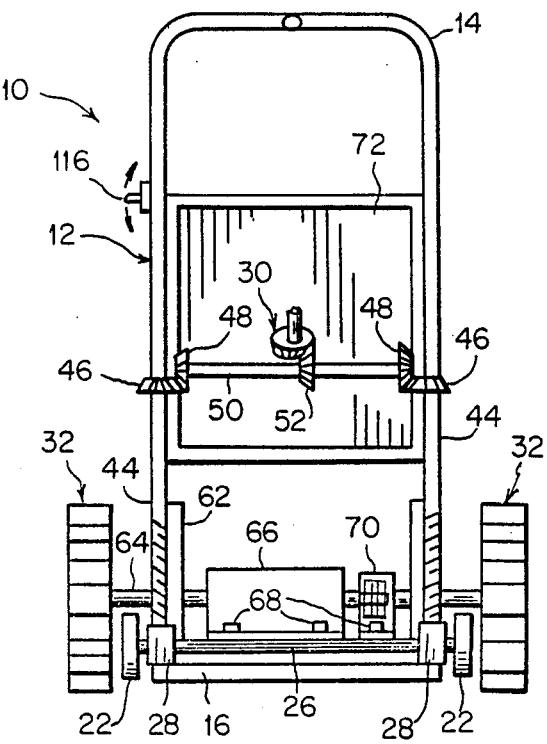

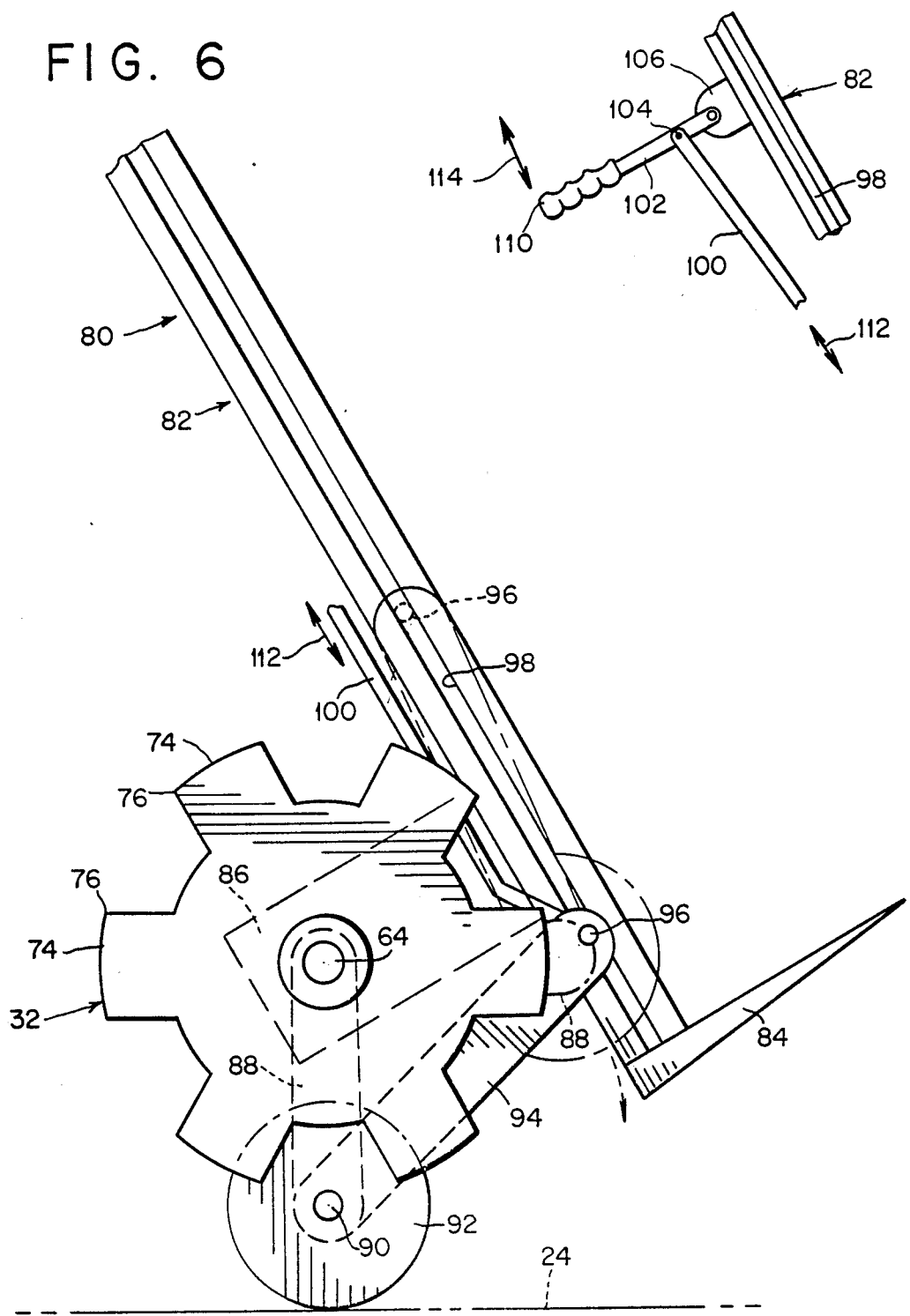

POWERED HEAVY-DUTY HAND TRUCK

BACKGROUND OF THE INVENTION

The instant invention relates generally to hand trucks, and more particularly, to a powered heavy-duty hand truck.

Numerous carts have been provided in the prior art that are adapted to transport packages and the like from place to place. For example, U.S. Pat. Nos. 4,550,924 of Alber, 3,907,138 of Rhodes, and 3,734,518 of Sawmiller et al, all are illustrative of such prior art. While these units may be suitable for the particular purpose to which they address, they would not be as suitable for the purpose of the present invention as hereafter described.

SUMMARY OF THE INVENTION

A primary object of the present invention is to provide a powered heavy-duty hand truck that will overcome the shortcomings of the prior art devices.

Another object is to provide a powered heavy-duty hand truck that will be of such design, as to enable hauling cargo up stairways and steps with a minimum of effort in doing so.

An additional object is to provide a powered heavy-duty hand truck that will reduce workers job related back injuries particularly caused by hand trucks of the prior art.

The present invention is designed to include special deep notched large diameter wheels for pulling the truck upwards on stairways and holding on steps and slippery surfaces, and the large diameter wheels enable the hand truck to be easy to use and overcome obstacles that will stop almost all of the other industrial hand and powered hand trucks of the prior art.

This invention will also employ a set of small wheels that will adapt to flat surfaces for travel thereon, and the truck is designed to carry any product, such as refrigerators, stoves, dishwashers, heavy equipment, et cetera.

A further object is to provide a powered heavy-duty hand truck that is simple and easy to use.

A still further object is to provide a powered heavy-duty hand truck that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic side view of the instant invention illustrated in use climbing a staircase with a load mounted thereon shown in phantom;

FIG. 2 is a diagrammatic rear view of the instant invention per se;

FIG. 3 is a diagrammatic fragmentary side view of the instant invention similar to FIG. 1 but illustrating small wheels in engagement with a ground surface;

FIG. 4 is a fragmentary diagrammatic partially exploded perspective view of the small wheel raising and lowering mechanism illustrated removed from the invention;

FIG. 5 is an enlarged cross sectional view taken in the direction of arrow 5 of FIG. 3;

FIG. 6 is an enlarged fragmentary diagrammatic side view of another embodiment of the instant invention illustrating a different wheel raising and lowering mechanism; and FIG. 7 is a reduced fragmentary diagrammatic side view of the control mechanism used with the embodiment illustrated in FIG. 6.

DETAILED DESCRIPTION OF THE PREFERRED EMBODIMENTS

Turning now descriptively to the drawings, in which like reference characters denote like elements throughout the several views, a hand truck 10 is shown to include a main frame 12 having a handle 14 and a toe plate 16 for stacking and support of cargo 18 that may be held to frame 12 by straps 20.

A pair of spaced apart small wheels 22 are provided for traversing a flat surface 24 and are secured to axle 26 that is journalled within bearing boxes 28 that are lowered and elevated by a crank mechanism 30. The lowering of the small wheels 22 is necessary, so as to have the large wheels 32 upward and not in contact with the surface 24 that is flat, as the large wheels 32 are mainly employed on steps 34.

A guide rail 36 is fixedly secured to each side of main frame 12 in a manner (not shown) and guide rails 36 are freely and slideably received within a T-shaped opening 38, through the bearing blocks 28, the tongues 40 defined by the opening 38, being slideable within the grooves 42 of the rails 36.

Referring now particularly to FIGS. 2 and 4, the crank mechanism 30 for lowering and elevating the small wheels 22 is shown to include a pair of worm shafts 44, one of which is right handed and the other being left handed. Each worm shaft 44 is engaged at an end with a mating threaded opening 46 provided through the blocks 28, and the other ends of the worm gears 44 are fixedly secured in a pair of bevel gears 46 that engage with similar bevel gears 48 secured to ends of a drive shaft 50. Trivial supports brackets et cetera haven been omitted from the drawing in order that the cooperation between moving parts can be more easily understood.

The worm shafts 44 and the drive shaft 50 are suitably supported in main frame 12 in a manner (not shown), and a third bevel gear 52 is fixedly secured and spaced between bevel gears 46, and is in engagement with another bevel gear 54 fixedly secured to the crank shaft 56 of a crank handle 58 that is rotated to lower and the raise small wheels 22. The crank shaft 56 is supported within a mounting block 60 that is secured to a rear portion of the main frame 12 in a manner (not shown).

Looking now at FIGS. 1, 2 and 3, it will be seen that a pair of mounting plates 62 are provided for the large wheels 32 and are suitably secured fixedly to side of main frame 12 in a manner (not shown), and wheels 32 are secured to shaft 64 of an electric motor 66 mounted by fasteners 68 to a bottom plate (not shown) that is secured to mounting plates 62.

A power cable housing 70 is also secured to the bottom plate by fasteners 68, for use with an electrical outlet receptacle when hand truck 10 is not employing the use of a self-contained battery pack 72 that is suitably secured within the main frame 12. The above battery pack 72 is also rechargeable.

It shall be recognized that the large diameter wheels 32 are provided with a plurality of equally and radially spaced apart lobes 74 with corners 76, and lobes 74 project outward for positive and non-slipping engagement with the steps 34, providing for easy ascending and descending of the hand truck 10 through use of electric power of the drive motor 66. It is to be further understood that electric motor 66 will integrally contain an appropriate gear train for increasing torque and reducing shaft speed so as to establish a practical power match between the motor and the work that the instant invention is designed to accomplish.

In use, a worker when preparing to ascend or descend the steps 34, switches on the electrical power supplied by the battery pack 72 or current from an electrical outlet receptacle. This electrical power causes the motor 66 to rotate the large wheels 32 slowly in the direction indicated by the arrow 78, which will cause the large wheels 32 to climb or descend the steps 34 respectively with little effort on the part of the worker. The switch 116 may be of the momentary type with two positions typically up for ascending and down for descending.

When the large wheels 32 are no longer necessary for step 34 travel, the crank handle 58 is rotated which causes the crank mechanism 30 to rotate the pair of worm shafts 44 which will lower the small wheels 22 to be in engagement with a flat surface 24 for flat terrain travel of the hand truck 10.

The worm shafts 44 when rotated in the openings 46 of the blocks 28 causes the elevating or lowering of the blocks 28 and the small wheels 22, depending upon the direction of rotation of the crank handle 58, and the inherent design characteristics of the worm shafts 44 and the blocks 28 cooperating therewith, causes the small wheels 22 to remain in the full upward or full downward position after release of the crank handle 58.

Referring now to FIGS. 6 and 7 of the drawings, a second embodiment 80 is shown to include a main frame 82 having a toe plate 84 fixedly secured thereto for the support of cargo. A pair of mounting plates 86 (one of which is shown) are fixedly secured to sides of main frame 82 and supports the same large wheels 32 on shafts 64 of motor 66 heretofore described of the hand truck 10.

However, a pair of first pivotal link levers 88 (one of which is shown), are mounted freely at one end to shafts 64 of motor 66, and a second pivotal link lever 94 is secured to each first pivotal link lever 88 by axle 90 at one end. The other ends of the second pivotal link levers 94 are provided with a pin 96 that projects and is fixedly secured thereto, the pins 96 being freely and slideably received within longitudinal grooves 98 provided in the sides of main frame 82, enabling small wheels 92 to be elevated or lowered as desired.

A pair of control rods 100 (one of which is shown), are pivotally secured to pins 96 at one end and are pivotally secured at an opposite end to a handle 102, of a pair, by pivot pin 104. Handles 102 are received in brackets 106 by pins 108, and a handle grip 110 is secured to the handles 102 for an operator to grip to pivot the handles 102. The movement of the control rods 100 is indicated by the arrow 112 and the pivotal movement of the handles 102 is indicated by the arrow 114.

In use, the large wheels 32 function in the same manner was described of hand truck 10, but the small wheels 92 are lowered and raised as follows:

When not employing the large wheels 32 to ascend steps 34, the handles 102 are grasped by the operator and pivoted downward, causing one end of the second pivotal link levers 94 to slide downwardly and pivotally force the first pivotal link levers 88 downward with the small wheels 92, resulting in the small wheels 92 being positioned below the large wheels 32, for travel on the flat surface 24. The nature of the linkage is such that the handle will held in the down position by biasing forces supplied by the pair of control rods 100.

When again it is desired to employ the large wheels 32 to ascend steps 34, the reverse procedure is effected by the pivoting of the handles 102.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A powered heavy-duty hand truck for easily ascending and descending steps, comprising:
   (a) a main frame with large diameter wheel means for the ascending and descending of said steps;
   (b) mounting means for rotatively securing said large diameter wheel means;
   (c) electric motor means for driving said large diameter wheel means;
   (d) rechargeable battery pack means for powering said electric motor means;
   (e) small diameter wheel means for said hand truck to traverse a relatively flat smooth surface, wherein said large diameter wheel means comprises a pair of wheels secured to a shaft of said electric motor means for driving said large diameter wheel means, and said shaft of said motor means is supported in said mounting means for securing said large diameter wheel means, and said mounting means comprises a pair of spaced apart plates fixedly secured to said main frame adjacent to said small diameter wheel means, wherein each large diameter wheel means that comprises said pair of wheels, is provided with a plurality of equally and radially spaced apart lobes that project outward for engagement with said steps; and
   (f) crank mechanism means for elevating and lowering said small diameter wheel means, wherein said small diameter wheel means comprises a pair of small wheels secured to ends of an axle received in a pair of bearing boxes forming a part of said crank mechanism means for elevating and lowering said small diameter wheel means, and a T-shaped opening through each of said pair of bearing boxes freely and slideably receives a guide rail of a pair of guide rails that are fixedly secured to longitudinal sides of said main frame, and an elevating and lowering means for said pair of bearing boxes and said pair of small wheels comprise a pair of manually driven worm shafts, one of which has right handed threads and the other has left handed threads.

2. A powered heavy-duty hand truck as recited in claim 1, wherein said pair of manually driven worm shafts thread into threaded openings provided through said pair of bearing boxes and said bearing boxes elevate and lower with said pair of small wheels simultaneously by means of a drive shaft of said crank mechanism means that is secured in said main frame, and a pair of bevel gears secured to ends of said drive shaft of said crank mechanism means, engage with bevel gear means secured to ends of said pair of manually driven worm shafts.

3. A powered heavy-duty hand truck as recited in claim 2, wherein a single bevel gear is secured intermediately on said drive shaft of said crank mechanism means and engages with gear means secured to a hand crank that rotates said crank mechanism means.

4. A powered heavy-duty hand truck for easily ascending and descending steps, comprising:
 (a) a main frame with large diameter wheel means for the ascending and descending of said steps;
 (b) mounting means for rotatively securing said large diameter wheel means;
 (c) electric motor means for driving said large diameter wheel means;
 (d) rechargeable battery pack means for powering said electric motor means;
 (e) small diameter wheel means for said hand truck to traverse a relatively flat smooth surface, wherein said large diameter wheel means comprises a pair of wheels secured to a shaft of said electric motor means for driving said large diameter wheel means, and said shaft of said motor means is supported in said mounting means for securing said large diameter wheel means, and said mounting means comprises a pair of spaced apart plates fixedly secured to said main frame adjacent to said small diameter wheel means;
 (f) link lever means for elevating and lowering said small diameter wheel means;
 (g) grooves in said main frame for providing guide means for elevating said small diameter wheel means;
 (h) a pair of first pivotal link levers of said link lever means, attached to said large diameter wheel means for suspending said small diameter wheel means between said large diameter wheel means;
 (i) a pair of second pivotal link levers cooperating with said pair of first pivotal link levers, and attached to said grooved main frame; and
 (j) pivotal handle means and control rod means attached to said link lever means for elevating and lowering said small diameter wheel means, wherein said first pair of pivotal levers are each secured at one end to a shaft mounting said large diameter wheel means, and another end of each of said first pair of pivotal link levers is mounted to a second shaft mounting said small diameter wheel means, wherein one end of each of said second pair of pivotal levers is mounted to said second shaft mounting said small diameter wheels, and another end of each of said second pair of second pivotal levers is provided with a projecting and fixedly secured pin that is freely and slideably received in said grooves provided in sides of said grooved main frame.

5. A powered heavy-duty hand truck as recited in claim 4, wherein said control rod means comprises a pair of control rods which are each secured at one end to one pin, said pair of said second pivotal levers, and another end of each said control rod is pivotally secured to said handle means that is pivotally secured to mounting bracket means secured to said grooved main frame, whereby when said pivotal handle means are pivoted, said small diameter wheel means are either elevated or lowered by said control rod means.

* * * * *